United States Patent
Lee et al.

(10) Patent No.: US 10,667,314 B2
(45) Date of Patent: May 26, 2020

(54) METHOD AND APPARATUS FOR TRANSMITTING AND RECEIVING A SIGNAL IN A WIRELESS COMMUNICATION SYSTEM SUPPORTING A RELAY UE

(71) Applicant: LG ELECTRONICS INC., Seoul (KR)

(72) Inventors: Ki-Dong Lee, San Diego, CA (US); Sanggook Kim, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/884,278

(22) Filed: Jan. 30, 2018

(65) Prior Publication Data

US 2018/0288822 A1 Oct. 4, 2018

Related U.S. Application Data

(60) Provisional application No. 62/479,255, filed on Mar. 30, 2017, provisional application No. 62/534,635, filed on Jul. 19, 2017.

(51) Int. Cl.
*H04W 76/15* (2018.01)
*H04B 7/14* (2006.01)
(Continued)

(52) U.S. Cl.
CPC .............. *H04W 76/15* (2018.02); *H04B 7/14* (2013.01); *H04W 52/0209* (2013.01);
(Continued)

(58) Field of Classification Search
CPC . H04B 7/00; H04B 7/14; H04B 7/155; H04B 7/2606; H04B 17/40; H04L 12/189;
(Continued)

(56) References Cited

U.S. PATENT DOCUMENTS

2013/0294331 A1* 11/2013 Wang .................... H04B 7/155
370/315
2013/0308520 A1* 11/2013 Damnjanovic ... H04W 52/0277
370/315

(Continued)

*Primary Examiner* — Yuwen Pan
*Assistant Examiner* — Paul P Tran
(74) *Attorney, Agent, or Firm* — Lee Hong Degerman Kang Waimey

(57) ABSTRACT

Disclosed herein is a method for transmitting a signal in a wireless communication system supporting a Relay UE. The method performed by the Relay UE comprises transmitting state information of the Relay UE to at least one Remote UE, wherein the state information of the Relay UE includes battery state information of the Relay UE, wherein the battery state information of the Relay UE includes at least one of a total capacity of a battery, a remaining life of the battery, or a remaining battery capacity, receiving a connection request for transmitting and receiving the signal from one or more remote UEs; determining whether or not to accept a connection request for the one or more remote UEs based on state information of the Relay UE; and transmitting a response including the determination result to the one or more remote UEs.

12 Claims, 12 Drawing Sheets

(51) Int. Cl.
  *H04W 88/04* (2009.01)
  *H04B 7/15* (2006.01)
  *H04W 52/02* (2009.01)

(52) U.S. Cl.
  CPC ............... *H04B 7/15* (2013.01); *H04W 88/04* (2013.01); *Y02D 70/00* (2018.01); *Y02D 70/10* (2018.01); *Y02D 70/12* (2018.01); *Y02D 70/124* (2018.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/21* (2018.01); *Y02D 70/23* (2018.01); *Y02D 70/24* (2018.01); *Y02D 70/26* (2018.01)

(58) Field of Classification Search
  CPC .. H04L 65/4076; H04W 76/10; H04W 76/14; H04W 76/15; H04W 76/20; H04W 76/27; H04W 88/02; H04W 88/04; H04W 4/023; H04W 24/10; H04W 16/26; H04W 40/22; H04W 52/0209; H04W 52/0277; H04W 52/02; Y02D 70/00; Y02D 70/10; Y02D 70/12; Y02D 70/1224; Y02D 70/1226; Y02D 70/124; Y02D 70/1242; Y02D 70/1262; Y02D 70/1264; Y02D 70/142; Y02D 70/144; Y02D 70/146; Y02D 70/15; Y02D 70/21; Y02D 70/23; Y02D 70/24; Y02D 70/26
  USPC ..................... 455/9, 11.1; 370/252, 312, 315
  See application file for complete search history.

(56) References Cited

U.S. PATENT DOCUMENTS

| | | | |
|---|---|---|---|
| 2015/0029866 A1* | 1/2015 | Liao | H04W 4/023 370/241 |
| 2016/0088563 A1* | 3/2016 | Koo | H04W 52/0251 455/566 |
| 2016/0088668 A1* | 3/2016 | Kim | H04W 48/16 370/315 |
| 2018/0084537 A1* | 3/2018 | Do | H04W 76/14 |
| 2018/0098370 A1* | 4/2018 | Bangolae | H04W 4/023 |
| 2018/0249520 A1* | 8/2018 | Li | H04W 40/22 |
| 2018/0255489 A1* | 9/2018 | Xu | H04W 36/0083 |

* cited by examiner

[Fig. 1]
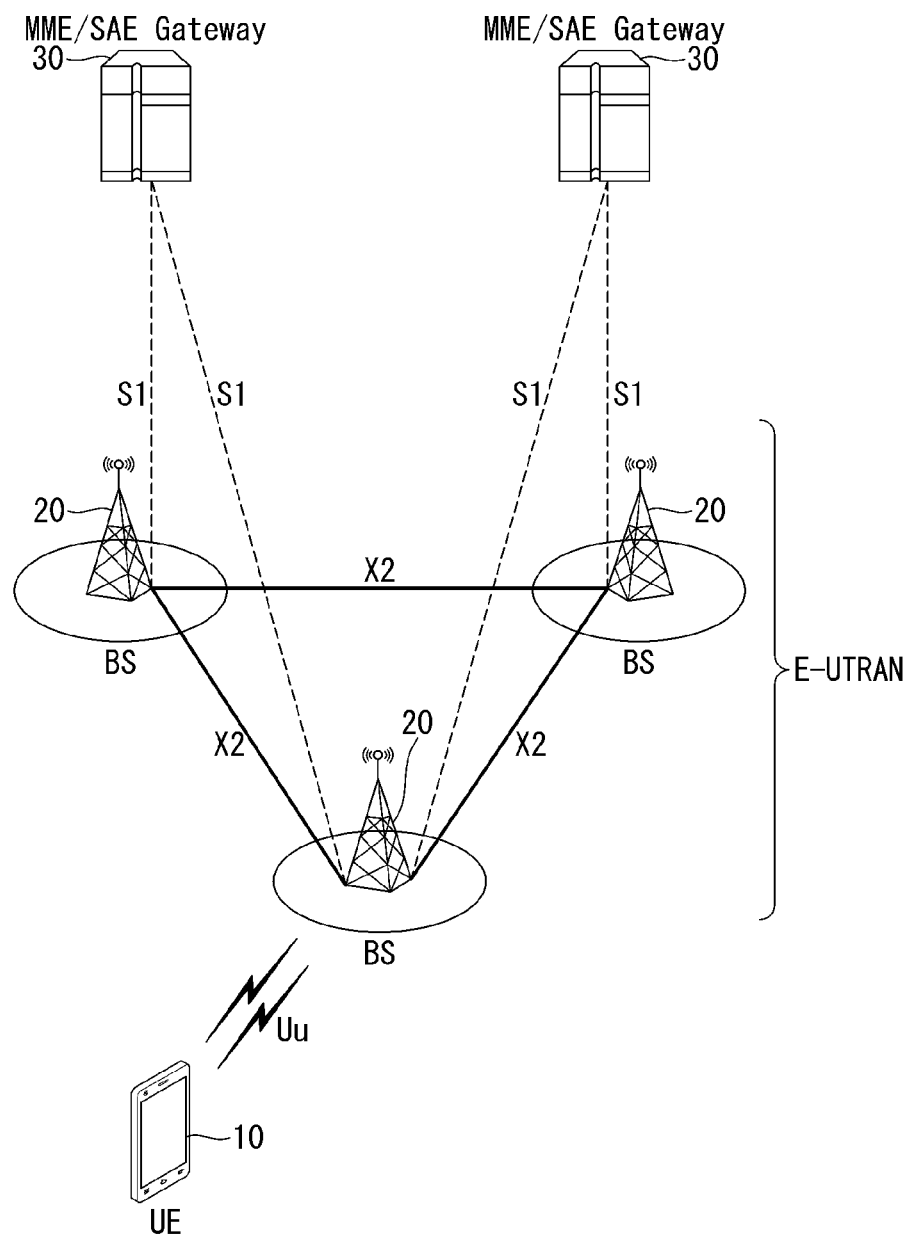

[Fig. 2]
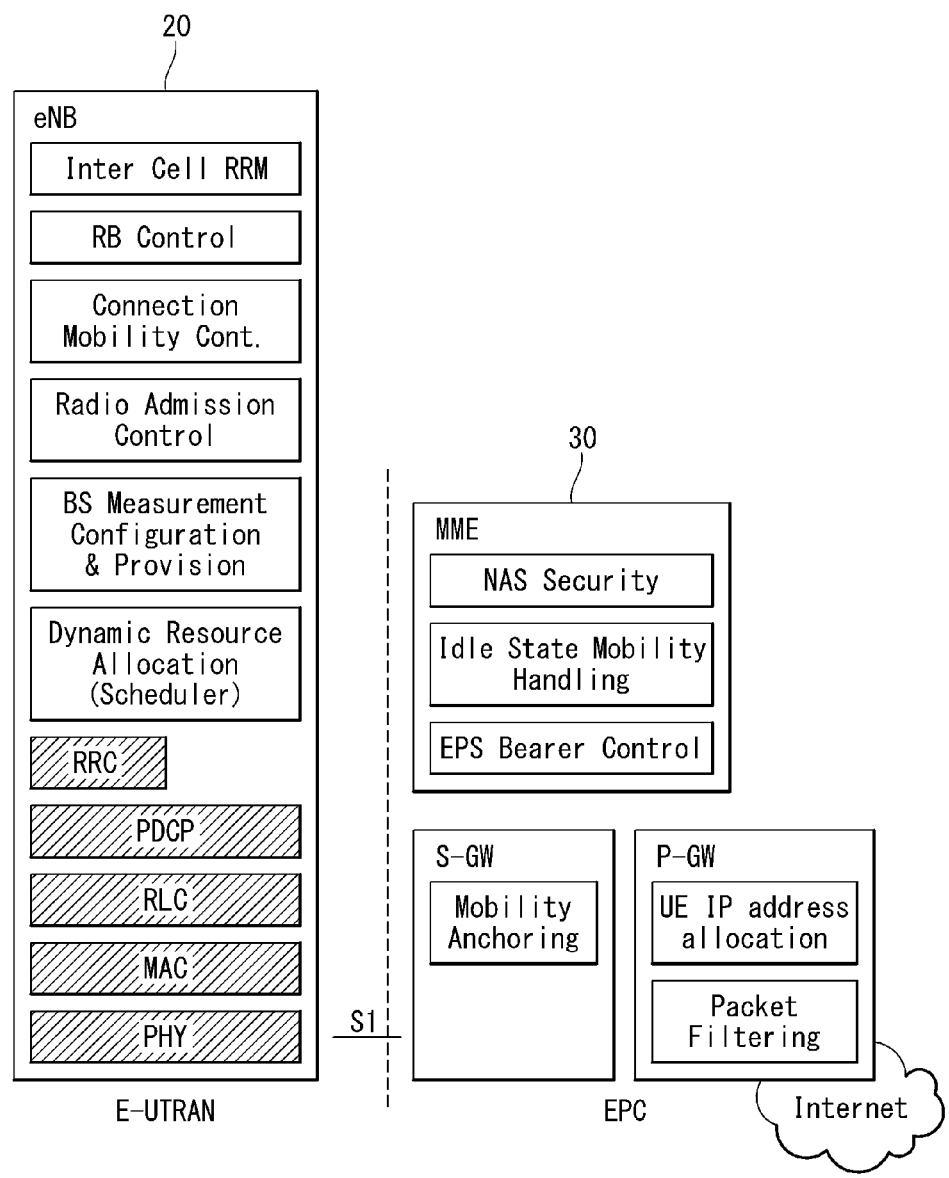

[Fig. 3]
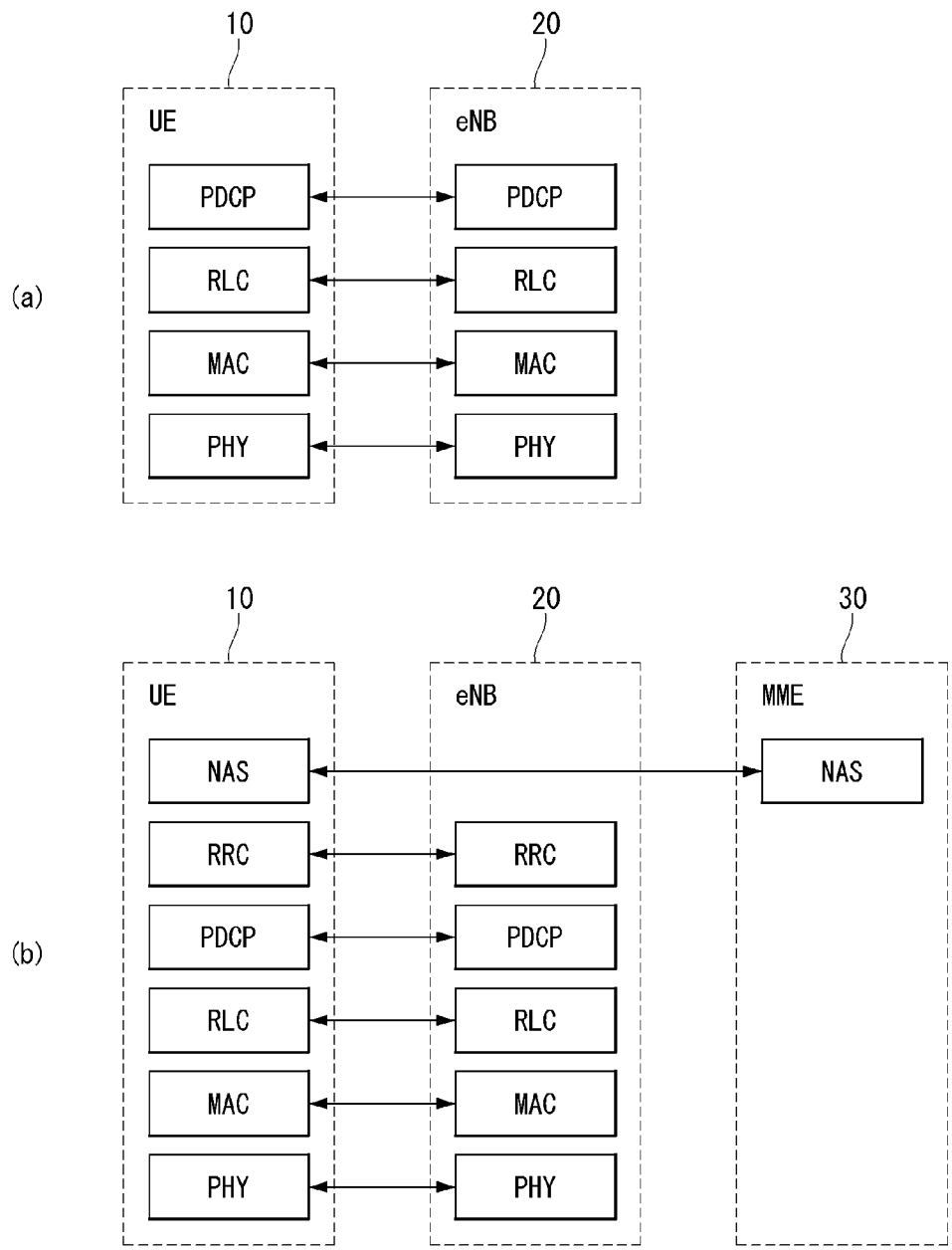

[Fig. 4]
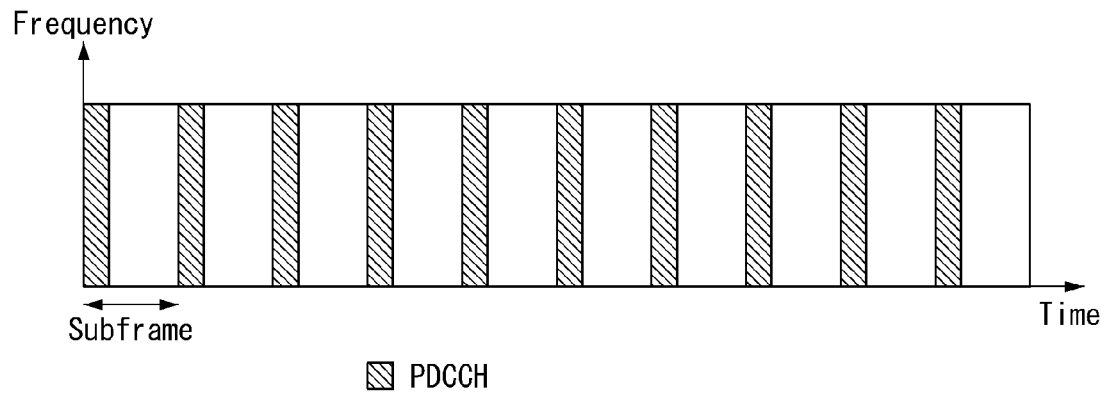
[Fig. 5]
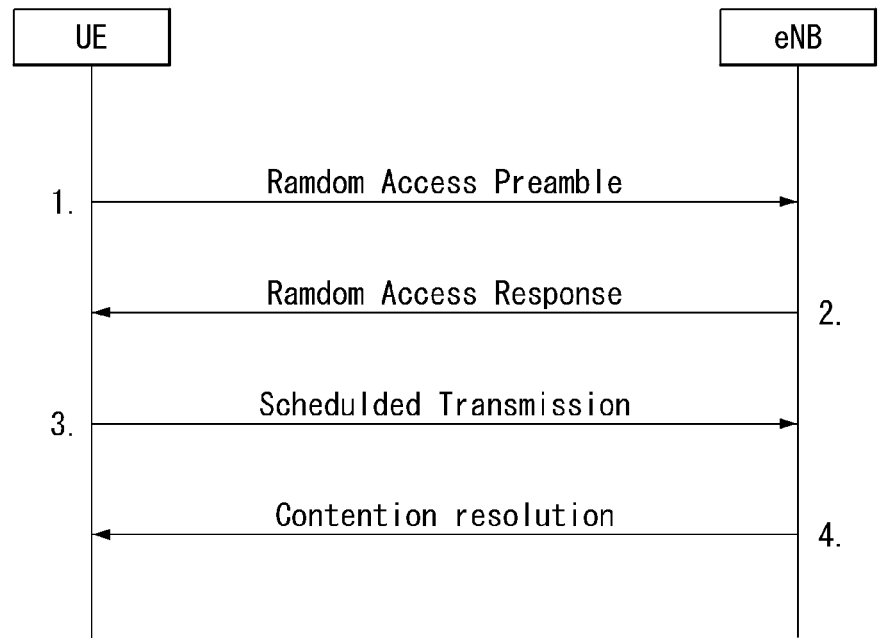

[Fig. 6a]
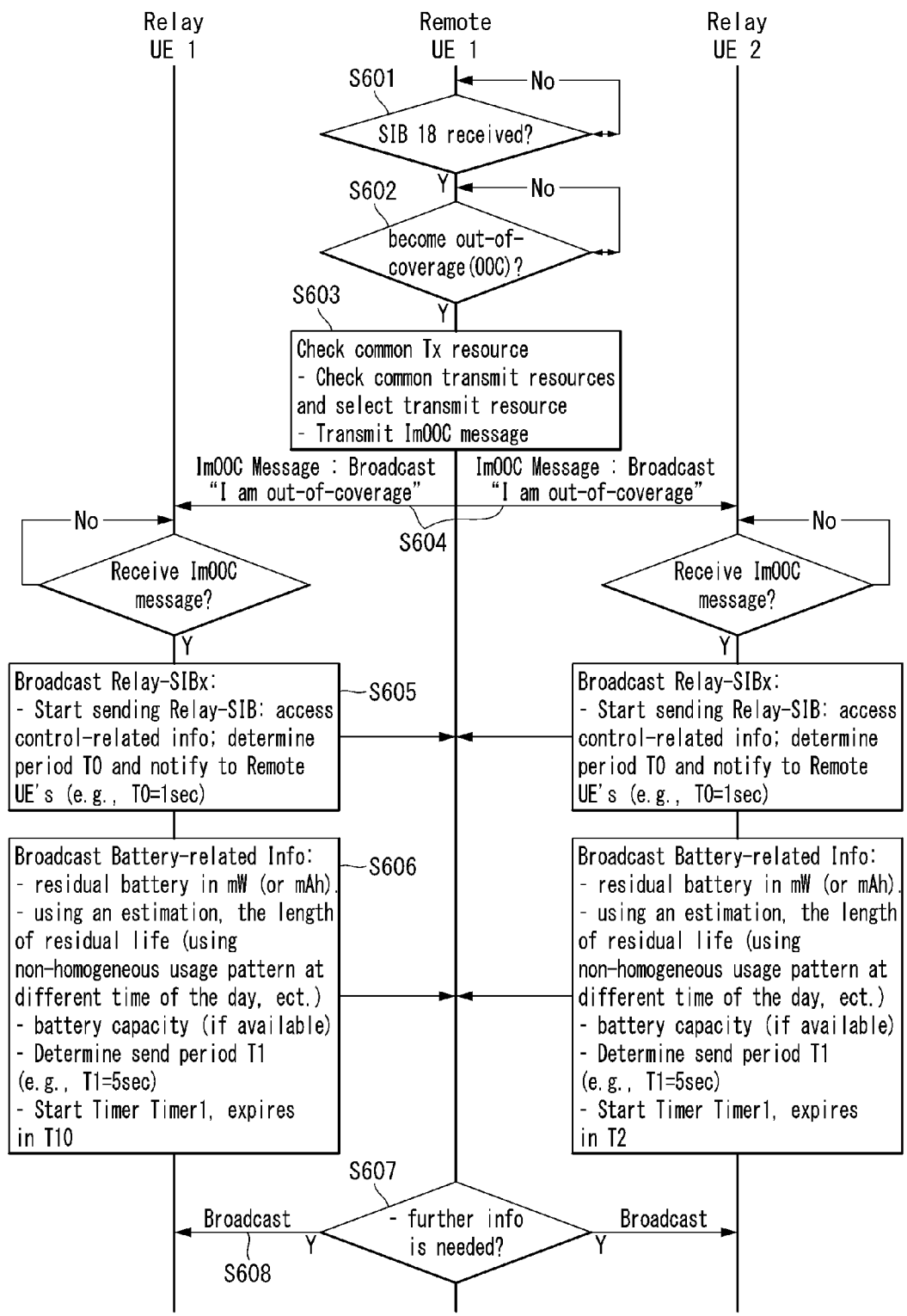

[Fig. 6b]
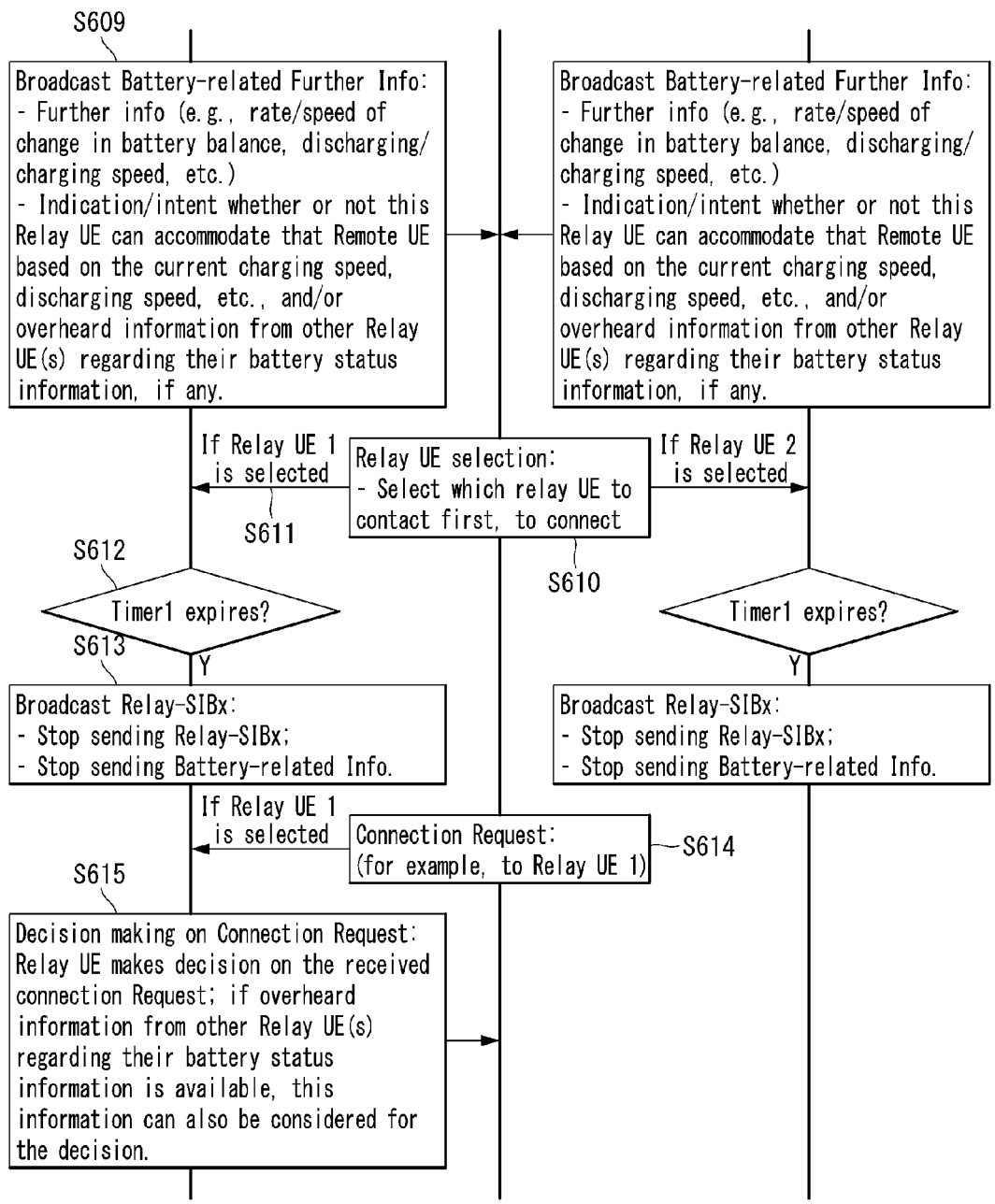

[Fig. 7a]
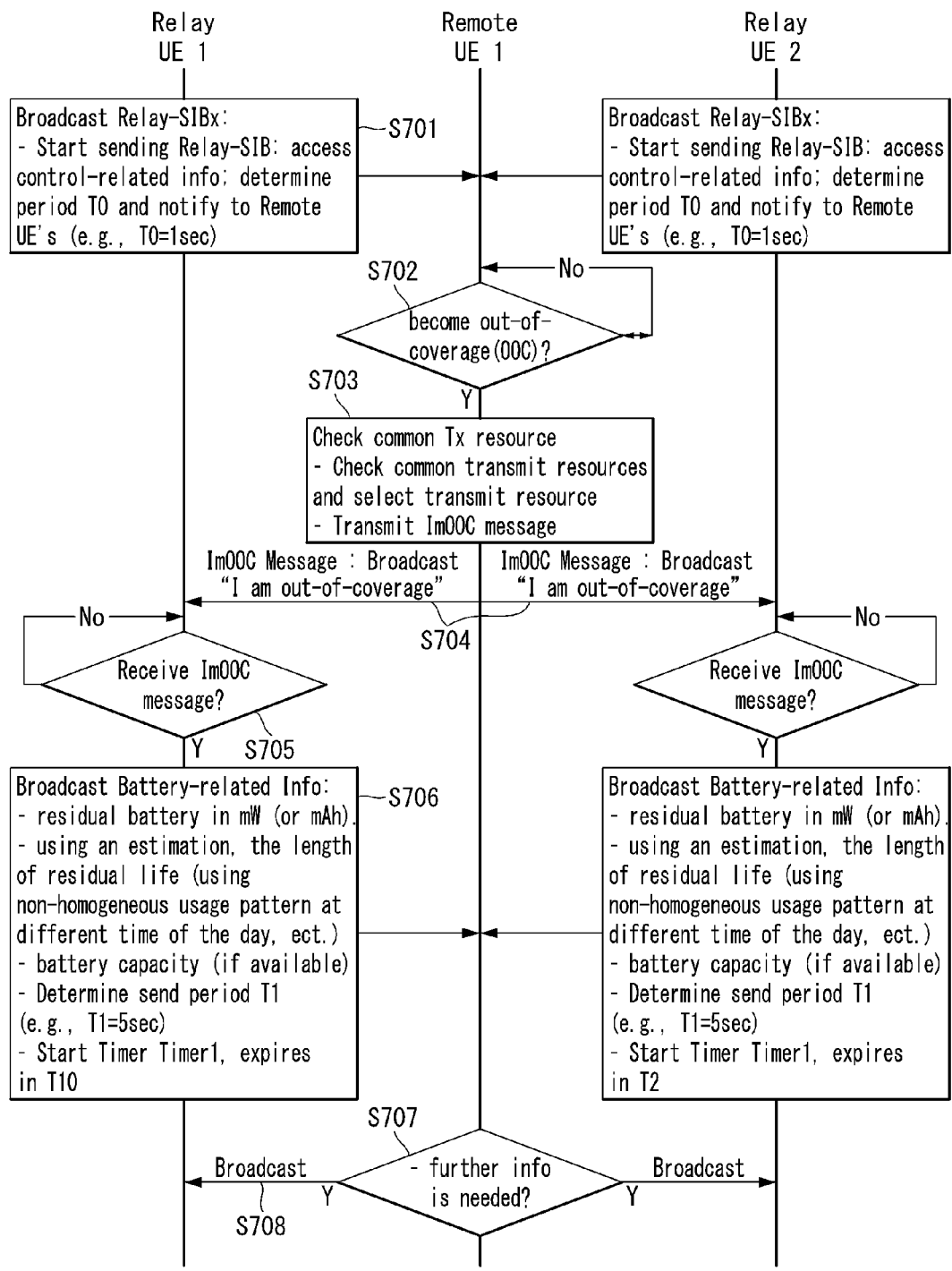

[Fig. 7b]
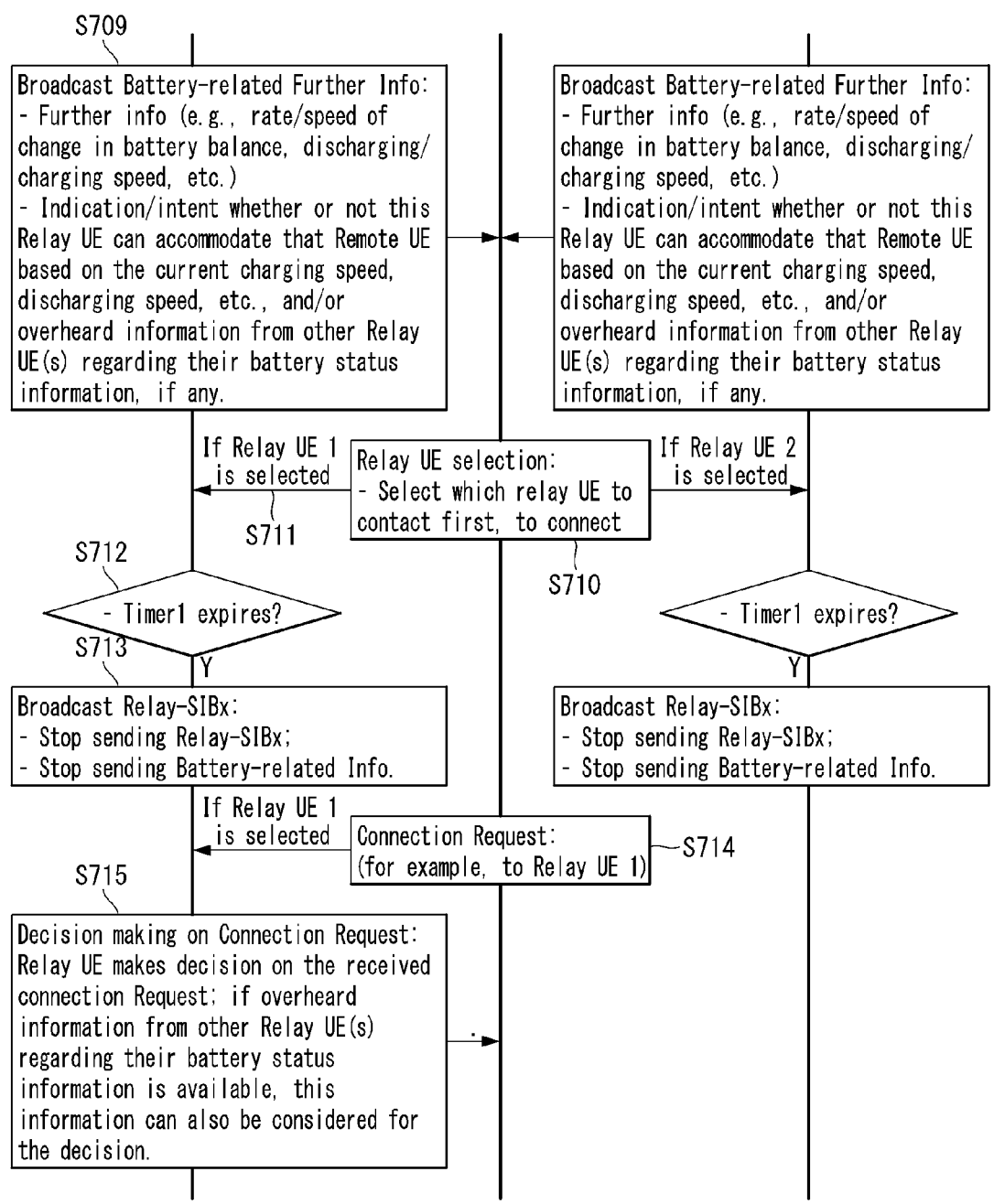

[Fig. 8]
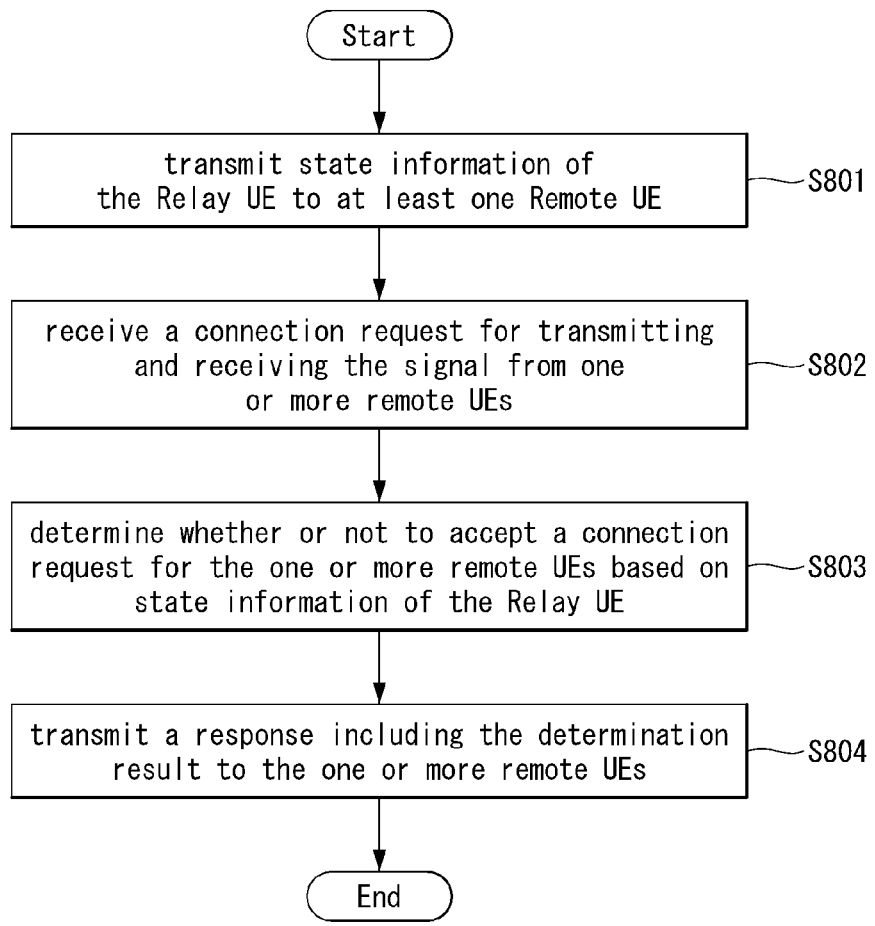

[Fig. 9]
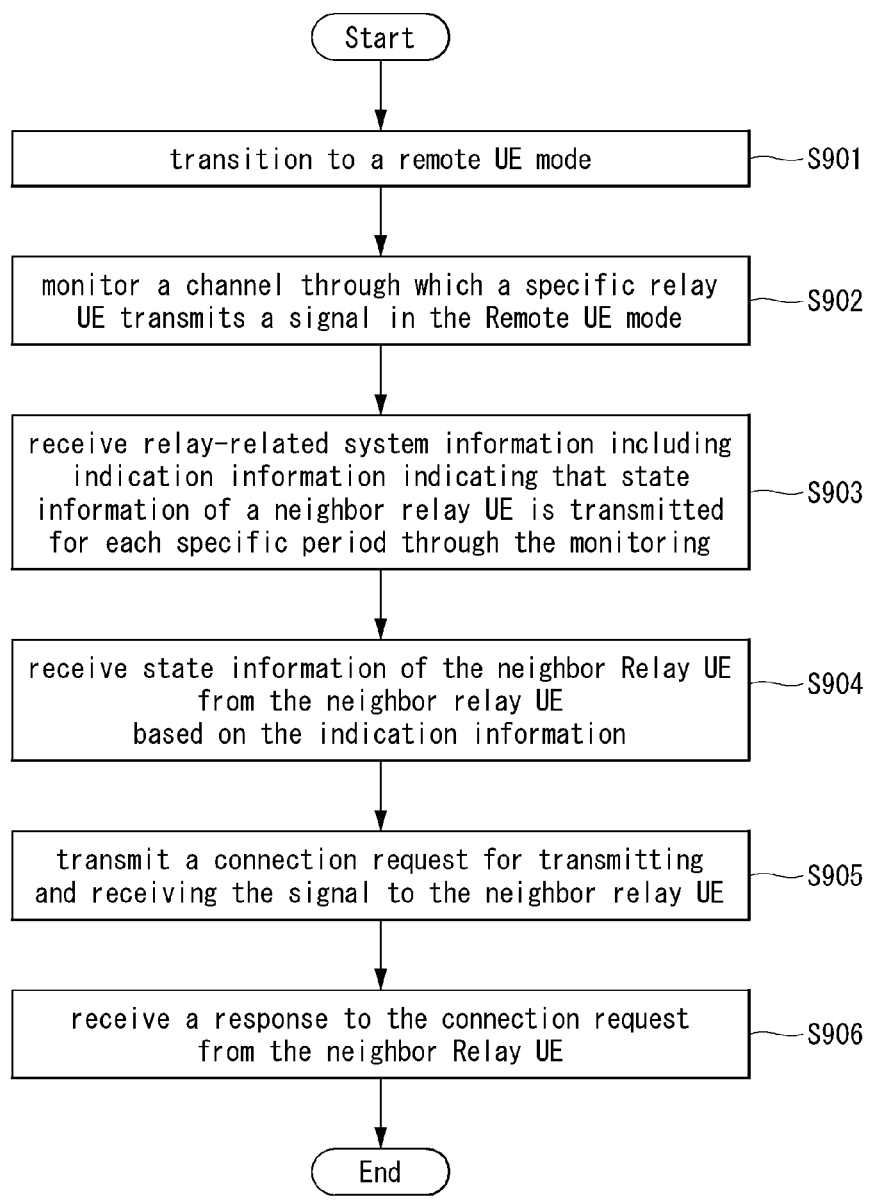

[Fig. 10]
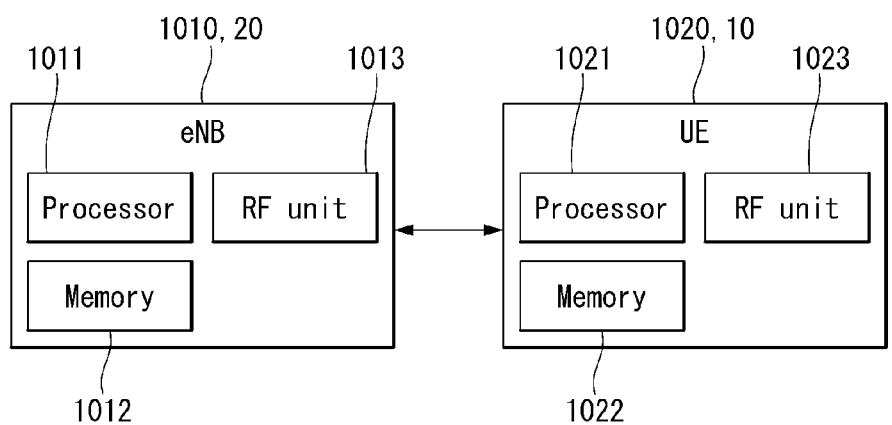

[Fig. 11]
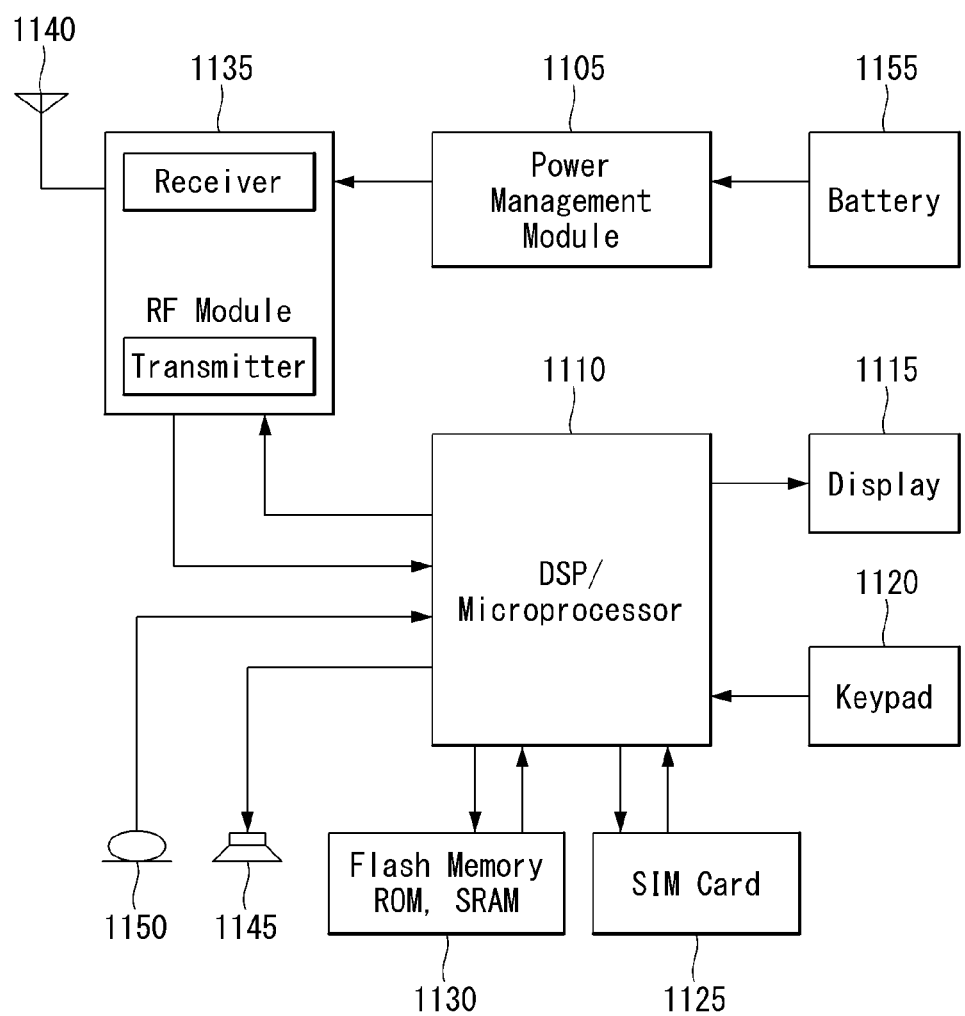

METHOD AND APPARATUS FOR TRANSMITTING AND RECEIVING A SIGNAL IN A WIRELESS COMMUNICATION SYSTEM SUPPORTING A RELAY UE

CROSS-REFERENCE TO RELATED APPLICATION

Pursuant to 35 U.S.C. § 119(e), this application claims the benefit of U.S. Provisional Patent Application Nos. 62/479,255, filed on Mar. 30, 2017 and 62/534,635, filed on Jul. 19, 2017, the contents of which are all hereby incorporated by reference herein in their entirety.

BACKGROUND OF THE INVENTION

Field of the Invention

The present invention relates to a method for transmitting and receiving a signal in a wireless communication system and, more particularly, to a method and apparatus for transmitting and receiving the signal between a Relay UE and a Remote UE using sidelink.

Related Art

Mobile communication systems have been developed to provide voice services while assuring users' activities and mobility. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support including unlicensed bands, or device networking.

SUMMARY OF THE INVENTION

An object of this specification is to provide a method of saving power of a Relay UE by efficiently transmitting system information of the Relay UE.

Another object of this specification is to newly define a method of operating a Remote UE mode in a Relay UE.

Objects to be achieved in this specification are not limited to the aforementioned advantages, and those skilled in the art to which the present invention pertains may evidently understand other objects from the following description.

This specification provides a method for transmitting a signal in a wireless communication system supporting a Relay UE.

The method performed by the Relay UE comprises transmitting state information of the Relay UE to at least one Remote UE, wherein the state information of the Relay UE includes battery state information of the Relay UE, wherein the battery state information of the Relay UE includes at least one of a total capacity of a battery, a remaining life of the battery, or a remaining battery capacity, receiving a connection request for transmitting and receiving the signal from one or more remote UEs; determining whether or not to accept a connection request for the one or more remote UEs based on state information of the Relay UE; and transmitting a response including the determination result to the one or more remote UEs.

Furthermore, in this specification, the state information of the Relay UE further includes information indicating the number of Remote UEs connected to the Relay UE.

Furthermore, this specification further comprises receiving state information of a neighbor Relay UE from the neighbor relay UE, wherein the state information of the neighbor Relay UE includes at least one of battery state information of the neighbor Relay UE and information indicating the number of Remote UEs connected to the neighbor Relay UE.

Furthermore, in this specification, the determination as to whether or not to accept the connection request for the one or more remote UEs uses at least one of the state information of the Relay UE and the state information of the neighbor Relay UE.

Furthermore, this specification further comprises receiving a request for transmitting first additional information from the one or more remote UEs; and transmitting the first additional information to the one or more remote UEs.

Furthermore, in this specification, the first additional information indicates whether the battery is sufficiently charged to connect to the one or more remote UEs, or whether the battery is being discharged.

Furthermore, in this specification, the first additional information further includes information indicating that accept for the connection request is allowed when the relay UE receives the connection request.

Furthermore, in this specification, the response includes information indicating whether another Relay UE is within the same coverage as the one or more Remote UEs if the connection request is not accepted.

Furthermore, in this specification, the first additional information is included in the state information of the Relay UE.

Furthermore, this specification further comprises receiving a request for transmitting a second additional information from the one or more remote UEs; and transmitting the second additional information to the one or more remote UEs.

Furthermore, in this specification, the second additional information indicates whether a speed at which the battery is charged is sufficient to accept the connection request from the one or more remote UEs or indicates a speed at which the battery is discharged.

Furthermore, in this specification, the second additional information is included in the state information of the Relay UE or included in the first additional information.

Furthermore, this specification further comprises transmitting identification information identifying the relay UE to the one or more remote UEs, wherein the identification information is transmitted together with the state information of the Relay UE.

Furthermore, in this specification, the neighbor relay UE is a UE that is within a coverage of the Relay UE.

Furthermore, in this specification, the Relay UE comprises a communication module configured to communicate with the outside in a wireless or a wired manner; and a processor functionally connected to the communication module, wherein the processor is configured: to transmit state information of the Relay UE to at least one Remote UE, wherein the state information of the Relay UE includes battery state information of the Relay UE, wherein the battery state information of the Relay UE includes at least one of a total capacity of a battery, a remaining life of the battery, or a remaining battery capacity, to receive a connection request for transmitting and receiving the signal from one or more remote UEs; to determine whether or not to accept a connection request for the one or more remote UEs based on state information of the Relay UE; and to transmit a response including the determination result to the one or more remote UEs.

This specification has an advantage of saving power of the Relay UE using efficient system information of the Relay UE.

In addition, this specification has an advantage of saving power of the Relay UE by newly defining an operation of a Remote UE mode.

Advantages to be obtained in this specification are not limited to the aforementioned advantages, and those skilled in the art to which the present invention pertains may evidently understand other advantages from the following description.

BRIEF DESCRIPTION OF THE DRAWINGS

FIG. 1 illustrates a block diagram illustrating network structure of an evolved universal mobile telecommunication system (E-UMTS).

FIG. 2 illustrates a block diagram depicting architecture of a typical E-UTRAN and a typical EPC.

In FIG. 3, (a) illustrates the user-plane protocol for the E-UMTS, and (b) illustrates the control-plane protocol stack for the E-UMTS.

FIG. 4 illustrates a Structure of the physical channel.

FIG. 5 illustrates a Random Access procedure for E-UTRAN initial access.

FIG. 6a and FIG. 6b illustrate an example of performing a method for power saving of a Relay UE and/or a Remote UE, the method which is proposed in this specification.

FIG. 7a and FIG. 7b illustrate another example of performing a method for power saving of a Relay UE and/or a Remote UE, the method which is proposed in this specification.

FIG. 8 is a flowchart illustrating an example of an operation method of a Relay UE for power saving of the Relay UE and/or a Remote UE, the method which is proposed in this specification.

FIG. 9 is a flowchart illustrating an example of an operation method of a Relay UE proposed in this specification.

FIG. 10 is a block diagram illustrating a wireless device in which methods as proposed herein may be implemented.

FIG. 11 illustrates a block diagram of a wireless device according to an example of the present specification.

DESCRIPTION OF EXEMPLARY EMBODIMENTS

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with a term, such as a "fixed station", a "base station (BS)", a "Node B", a "base transceiver system (BTS)", an "access point (AP)", a "macro eNB or master eNB (MeNB)" or a "secondary eNB (SeNB)." The term "UE" may be replaced with a term, such as a "terminal", a "mobile station (MS)", a "user terminal (UT)", a "mobile subscriber station (MSS)", a "subscriber station (SS)", a "station (STA)", an "advanced mobile station (AMS)", a "wireless terminal (WT)", a machine-type communication (MTC) device", a "machine-to-machine (M2M) device", a "device-to-device (D2D) device" or a wireless device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), LTE-Advanced Pro (LTE-A Pro), 5G New Radio (NR), and 3GPP2. Steps or parts that are not described to clarify the technical features of the present invention may be supported by those documents. Furthermore, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink.

LTE-A is an evolution of 3GPP LTE. LTE-A Pro is an evolution of 3GPP LTE-A. 5G NR is a revolution of 3GPP LTE-A that will be implemented by OFDMA or its variants.

For the purposes of the present invention, the following terms and definitions apply.

Access Control: the process that checks whether a UE is allowed to access and to be granted services in a closed cell.

Carrier frequency: center frequency of the cell.

Cell: combination of downlink and optionally uplink resources. The linking between the carrier frequency of the downlink resources and the carrier frequency of the uplink resources is indicated in the system information transmitted on the downlink resources.

Cell Group: in dual connectivity, a group of serving cells associated with either the MeNB or the SeNB.

DCN-ID: DCN identity identifies a specific dedicated core network (DCN).

Dual Connectivity: mode of operation of a UE in RRC_CONNECTED, configured with a Master Cell Group and a Secondary Cell Group.

Elementary Procedure: XwAP protocol consists of Elementary Procedures (EPs). An XwAP Elementary Procedure is a unit of interaction between an eNB and WT. An EP consists of an initiating message and possibly a response message. Two kinds of EPs are used:
  Class 1: Elementary Procedures with response (success or failure),
  Class 2: Elementary Procedures without response.

E-UTRAN Radio Access Bearer (E-RAB): an E-RAB uniquely identifies the concatenation of an S1 Bearer and the corresponding Data Radio Bearer. When an E-RAB exists, there is a one-to-one mapping between this E-RAB and an EPS bearer of the Non Access Stratum.

Frequency layer: set of cells with the same carrier frequency.

FeMBMS: further enhanced multimedia broadcast multicast service.

Handover: procedure that changes the serving cell of a UE in RRC_CONNECTED.

LTE bearer: in LTE-WLAN Aggregation, a bearer whose radio protocols are located in the eNB only to use eNB radio resources only.

LWA bearer: in LTE-WLAN Aggregation, a bearer whose radio protocols are located in both the eNB and the WLAN to use both eNB and WLAN resources.

LWAAP PDU (Protocol Data Unit): in LTE-WLAN Aggregation, a PDU with DRB (Data Radio Bearer) ID (Identification or IDentifier) generated by LWAAP entity for transmission over WLAN.

Master Cell Group: in dual connectivity, a group of serving cells associated with the MeNB, comprising of the PCell and optionally one or more SCells.

Master eNB: in dual connectivity, the eNB which terminates at least S1-MME (mobility management entity).

MBMS-dedicated cell: cell dedicated to MBMS (multimedia broadcast multicast service) transmission. MBMS-dedicated cell is not supported in this release.

MBMS/Unicast-mixed cell: cell supporting both unicast and MBMS transmissions.

FeMBMS/Unicast-mixed cell: cell supporting MBMS transmission and unicast transmission as SCell.

MCG (Master Cell Group) bearer: in dual connectivity, a bearer whose radio protocols are only located in the MeNB (Master eNB) to use MeNB resources only.

Membership Verification: the process that checks whether a UE is a member or non-member of a hybrid cell.

PLMN ID Check: the process that checks whether a PLMN ID is the RPLMN identity or an EPLMN identity of the UE.

Power saving mode: mode configured and controlled by NAS that allows the UE to reduce its power consumption.

Primary PUCCH group: a group of serving cells including PCell (Primary Cell) whose PUCCH signalling is associated with the PUCCH (Physical Uplink Control Channel) on PCell.

Primary Timing Advance Group: Timing Advance Group containing the PCell. In this specification, Primary Timing Advance Group refers also to Timing Advance Group containing the PSCell unless explicitly stated otherwise.

PUCCH group: either primary PUCCH group or a secondary PUCCH group.

PUCCH SCell: a Secondary Cell configured with PUCCH.

RACH-less HO (Handover)/SeNB (Secondary eNB) change: skipping random access procedure during handover or change of SeNB.

Remote UE: a ProSe-enabled Public Safety UE, that communicates with a PDN (Packet Data Network) via a ProSe UE-to-Network Relay.

SCG (Secondary Cell Group) bearer: in dual connectivity, a bearer whose radio protocols are only located in the SeNB to use SeNB resources.

Secondary Cell Group: in dual connectivity, a group of serving cells associated with the SeNB, comprising of PSCell and optionally one or more SCells.

Secondary eNB: in dual connectivity, the eNB that is providing additional radio resources for the UE but is not the Master eNB.

Secondary PUCCH group: a group of SCells whose PUCCH signalling is associated with the PUCCH on the PUCCH SCell.

Secondary Timing Advance Group: Timing Advance Group containing neither the PCell nor PSCell.

Split bearer: in dual connectivity, a bearer whose radio protocols are located in both the MeNB and the SeNB to use both MeNB and SeNB resources.

Split LWA bearer: in LTE-WLAN Aggregation, a bearer whose radio protocols are located in both the eNB and the WLAN to use both eNB and WLAN radio resources.

Switched LWA bearer: in LTE-WLAN Aggregation, a bearer whose radio protocols are located in both the eNB and the WLAN but uses WLAN radio resources only.

Timing Advance Group: a group of serving cells that is configured by RRC and that, for the cells with an UL configured, use the same timing reference cell and the same Timing Advance value.

WLAN Termination: the logical node that terminates the Xw interface on the WLAN side.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signalling to eNodeBs 20, NAS signalling security, AS Security control, Inter CN node signalling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBRFor clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2 is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

FIGS. 3(*a*) and 3(*b*) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 3(*a*) and 3(*b*) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 3(*a*), the RLC and MAC layers (terminated in an eNodeB 20 on the network side) may perform functions such as Scheduling, Automatic Repeat Request (ARQ), and Hybrid Automatic Repeat Request (HARQ). The PDCP layer (terminated in eNodeB 20 on the network side) may perform the user plane functions such as header compression, integrity protection, and ciphering.

As illustrated in FIG. 3(*b*), the RLC and MAC layers (terminated in an eNodeB 20 on the network side) perform the same functions for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling.

The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area and may perform PLMN selection and cell re-selection. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover and inter-RAT cell change order to GERAN with NACC) of the UE, and the network can perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

A physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1.0 ms. in length, consists of several symbols. The particular symbol(s) of the sub-frame, such as the first symbol of the sub-frame, can be used for downlink control channel (PDCCH). PDCCHs carries dynamic allocated resources, such as PRBs and MCS.

A transport channel transfers signaling and data between the L1 and MAC layers. A physical channel is mapped to a transport channel.

Downlink transport channel types include a Broadcast Channel (BCH), a Downlink Shared Channel (DL-SCH), a Paging Channel (PCH) and a Multicast Channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming.

The PCH is used for paging a UE. The MCH is used for multicast or broadcast service transmission.

Uplink transport channel types include an Uplink Shared Channel (UL-SCH) and Random Access Channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a Broadcast Control Channel (BCCH), a Paging Control Channel (PCCH), a Common Control Channel (CCCH), a Multicast Control Channel (MCCH) and a Dedicated Control Channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a Dedicated Traffic Channel (DTCH) and a Multicast Traffic Channel (MTCH). The DTCH is a point-to-point channel, dedicated to one UE for the transfer of user information and can exist in both uplink and downlink.

The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

It is known that different cause values may be mapped on the signature sequence used to send messages between a UE and eNB and that either Channel Quality Indicator (CQI) or path loss and cause or message size are candidates for inclusion in the initial preamble.

FIG. 5 illustrates different messages exchanged between a UE and eNB during initial access.

When a UE wishes to access the network and determines a message to be transmitted, the message may be linked to a purpose and a cause value may be determined. The size of the ideal message number 3 illustrated in FIG. 5 may also be determined by identifying all optional information and different alternative sizes, such as by removing optional information, or an alternative "scheduling request" message may be used.

The UE acquires necessary information for the transmission of the preamble, UL interference, Pilot Transmit power and required Signal-to-Noise Ratio (SNR) for the preamble detection at the receiver or combinations thereof. This information must allow the calculation of the initial transmit power of the preamble. It is beneficial to transmit the uplink message in the vicinity of the preamble from a frequency point of view in order to ensure that the same channel is used for the transmission of the message.

The UE should take into account the uplink interference and the uplink path loss in order to ensure that the network receives the preamble with a minimum SNR. The uplink interference can be determined only in the ENodeB and, therefore, must be broadcast by the ENodeB and received by the UE prior to the transmission of the preamble.

The uplink path loss can be considered to be similar to the downlink path loss and can be estimated by the UE from the received Rx (receiver) signal strength when the transmit power of some pilot sequence of the cell is known to the UE.

The required uplink SNR for the detection of the preamble would typically depend on the NodeB configuration, such as a number of Rx antennas and receiver performance.

There may be advantages to transmitting the rather static Transmit power of the pilot and the necessary uplink SNR separately form the varying uplink interference and possibly the power offset required between the preamble and the message.

The initial transmission power of the preamble can be roughly calculated according to the following formula:

Transmit power=TransmitPilot−RxPilot+ULInterference+Offset+SNRRequired.

Therefore, any combination of SNRRequired, ULInterference, TransmitPilot and Offset can be broadcast. In principle, only one value must be broadcast. This is essentially the method in current UMTS systems, although the UL interference in LTE will mainly be neighboring cell interference that is probably more constant than in UMTS.

The UE determines the initial uplink transmit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power for the preamble is not adequate. Another preamble will most likely be transmitted if no acknowledgement or a negative acknowledgement is received by the UE before the next random access attempt. The transmit power of the preamble can be increased, and/or the preamble can be transmitted on a different uplink frequency in order to increase the probability of detection.

Therefore, the actual transmit power of the preamble that will be detected does not necessarily correspond to the initial transmit power of the preamble as initially calculated by the UE.

The UE must determine the possible uplink transport format.

The transport format, which may include Modulation and Coding Scheme (MCS) and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the UE since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the UE according to the received preamble because the UE transmit power compared to the maximum allowed or possible UE transmit power is not known to the eNB, given that the UE will most likely consider the measured path loss in the downlink or some equivalent measure for the determination of the initial preamble transmission power.

The eNB could calculate a difference between the path loss estimated in the downlink compared and the path loss of the uplink. However, this calculation is not possible if power ramping is used and the UE transmit power for the preamble does not correspond to the initially calculated UE transmit power.

Furthermore, the precision of the actual UE transmit power and the transmit power at which the UE is intended to transmit is very low. Therefore, it has been proposed to code the path loss or CQI estimation of the downlink and the message size or the cause value in the uplink in the signature.

Proximity-Based Services

The Study of Proximity-based Services identified use cases and scenarios that could be provided by the 3GPP LTE system based on UEs being in proximity of each other.

The normative RAN work on enabling Proximity Services was started in LTE Rel.12 with focus on Public Safety applications. The following major features were standardized in LTE Rel.12:

Device-to-device discovery in network coverage (both Commercial and Public Safety use cases).

Device-to-device broadcast communication, with higher layers supporting groupcast and unicast communication for within/partial and out of network coverage scenarios mainly targeting Public Safety use cases.

The work on Public Safety services continued in LTE Rel.13 to enable: Type-1 discovery for the partial and outside network coverage scenarios; the L3-based UE-to-Network relaying reusing LTE Rel.12 D2D communication; and basic priority handling mechanisms for D2D communication.

There is a lot of interest to use LTE technology to connect and manage low cost MTC devices. One important example of such low cost devices are wearables, which also have the benefit of almost always being in close proximity to a smartphone that can serve as a relay. In this SI we aim to study the application of D2D, including non-3GPP short-range technologies, to such devices. In particular there are two main aspects to be further enhanced in LTE technology to enable D2D aided wearable and MTC applications:

Enhancement of UE-to-Network relaying functionality. The UE-to-Network relaying architecture in ProSe does not differentiate the traffic of the remote UE from that of the relay UE in the access stratum. This model limits the ability of the network and the operator to treat the remote UE as a separate device, e.g. for billing or security. In particular, the 3GPP security associations never reach end-to-end between the network and the remote UE, meaning that the relay UE has clear text access to the remote UE's communications. UE-to-Network relaying should be enhanced to support end-to-end security through the relay link, service continuity, E2E QoS where possible, efficient operation with multiple remote UEs, and efficient path switching between Uu and D2D air-interfaces. Relaying using D2D can also be based on non-3GPP technologies such as Bluetooth and Wi-Fi. Some enhancements such as service continuity can make relaying more attractive for such technologies in commercial use cases. This can be especially useful to wearables due to their usage patterns with proximity to the user's smartphone, as well as form-factor limitations that may make a direct Uu connection less practical (e.g. limits on battery size). Relaying can enable significant power savings for remote UEs (that are getting their traffic relayed). This is especially true for deep coverage scenarios. One cost effective way of introduce relaying is to use unidirectional D2D links between remote devices and relay devices. In this case, the relay UE is utilised to relay only uplink data from the remote UE. The advantage of this approach is no additional RF capability for D2D reception is added to the remote UE.

Enhancements to enable reliable unicast PC5 link to at least support low power, low rate and low complexity/cost devices. Low cost D2D devices can be enabled by reusing the ideas developed during NB-IoT (Narrow Band-IoT) and eMTC studies, e.g., the NB-IoT/eMTC uplink waveform can be reused for D2D. Such devices will potentially use a single modem for communicating with the Internet/cloud and for communicating with proximal devices. The current PC5 link design inherited from the broadcast oriented design driven by public safety use cases, represents a bottleneck that prevents low power and reliable D2D communication, due to lack of any link adaptation and feedback mechanisms. These shortcomings do not allow achieving target performance metrics for wearable and MTC use cases in terms of power consumption, spectrum efficiency, and device complexity. Reduced power consumption and low complexity are the key attributes of wearable and MTC use cases that are typically characterized by small form factors and long battery lifetime.

This study item aims to evaluate and study the benefits of enhanced UE-to-network relaying, and of using an enhanced form of the LTE sidelink air-interface, for D2D aided services focusing on wearable and MTC applications. In order to enable these use cases, the sidelink air-interface should be optimized for energy efficient communication supporting various data rates.

The objective of the study is to study enhancements to Prose UE-to-network relaying and to the LTE D2D framework for commercial and public safety applications such as wearable devices. It is assumed that evolved Remote UEs can support both WAN and D2D connection, and that evolved Remote UEs have 3GPP subscription credentials. The D2D connection is realized by either LTE sidelink or non-3GPP technology. All non-3GPP technologies should be considered transparent for generic relay architecture over them. The primary objective of the study is to address power efficiency for evolved Remote UEs (e.g. wearable devices). The study item will study following coverage scenarios:

Evolved Remote UE and evolved ProSe UE-to-Network Relay UE are EUTRAN in-coverage.

Evolved ProSe UE-to-Network Relay UE has a Uu connection to the eNB and evolved Remote UE can be in enhanced coverage (enhanced coverage implies that the UE is connecting to the network via NB-IOT or Rel-13 MTC in CE mode).

Evolved ProSe UE-to-Network Relay UE is in EUTRAN coverage and evolved Remote UE is out of coverage of EUTRAN.

Following is the list of objectives for the three identified coverage scenarios:

Study and evaluate a generic Layer 2 evolved UE-to-Network Relay architecture, including methods for the network to identify, address, and reach a evolved Remote UE via an evolved ProSe UE-to-Network Relay UE.

Study the possibility of a common solution supporting the following use cases

UE to network relaying over non-3GPP access (Bluetooth/WiFi).

UE to network relaying over LTE sidelink.

Unidirectional and bidirectional UE to network relay.

Investigate potential impacts to protocol stack, procedure and signalling mechanisms, such as authorization, connection setup, UE mobility, parameter configuration and security, allowing multiple evolved Remote UEs via an evolved ProSe UE-to-Network Relay UE.

Study path selection/switch between the cellular link (Uu air interface) and relay link and provide service continuity and QoS.

Study necessary LTE sidelink enhancements.

Introduce additional evaluation assumptions to the sidelink evaluation methodology focusing on analysis of wearable use cases.

Identify mechanisms to enable QoS, more efficient, reliable, and/or low complexity/cost & low energy sidelink.

Study additional co-existence issues with adjacent carrier frequencies that may arise due to the new mechanisms identified.

FDD, H-FDD and TDD should be considered for this work. The impact of sidelink operation on cellular traffic, spectrum and QoS of other cellular services are assumed to be fully controlled by the network. Co-existence with Rel-13 public safety devices in the same spectrum will be taken into account. There is no need of service continuity between Release 13 and Release 14 public safety UEs. So when (Evolved) Remote UE moves from ProSe UE-to-Network Relay to Evolved ProSe UE-to-Network Relay or vice versa there will be no service continuity.

Hereinafter, there is description about a Relay UE proposed in this specification and/or various power saving methods of a Remote UE.

First Embodiment

The first embodiment is about a method by which the Relay UE efficiently utilizes system information (e.g., Relay SIB) for a power saving purpose.

Features and procedures required to implement the method proposed in this specification are as below.

Upon receiving a request from a neighboring UE(s), the Relay UE broadcasts its own state information.

The neighboring UE(s) may be Remote UEs.

If a Remote UE corresponding to the neighboring UE is connected to the Relay UE (or in a connection mode), the Relay UE may utilize PC 5 interface (or sidelink) in order to transmit the request.

Then, the Relay UE checks its own battery status.

Battery state information about a battery status of an UE may include at least one: a residual battery capacity; a remaining life (length) of battery, battery usage pattern, status of battery usage per application, or a battery capacity.

Then, the Relay UE checks whether its battery is being charged.

Checking of a battery charging status may be used as the same as checking of a power-connected status.

A result from checking of the battery charging status may indicate that: 1) the battery is not power-connected (which means the battery is being discharged), 2) the battery is power-connected but not sufficiently charged, or 3) the battery is power connected and sufficiently charged.

In the case of a situation 2) (where the battery is power-connected but not sufficiently charged), the Relay UE may further perform a procedure of comparing a battery charge value and a threshold value dependent upon a certain criteria.

Then, the Relay UE exposes its battery status to neighboring UEs.

In this case, "expose" may mean that the Relay UE broadcasts its battery status or that the Relay UE notifies its battery status to a particular Remote UE upon connection with the particular Remote UE.

In addition, battery condition information may include: information about a charged status of the battery; information indicating a (latest) discharge rate (that is, a discharge speed may provide a fast projection of a charged state (battery condition) of the near future; and a period of transmission of the battery state information.

Hereinafter, a method by which the Relay UE transmits system information will be described in more detail with reference to FIG. 6.

For convenience of explanation, system information of the Relay UE is expressed as "Relay SIB (System Information Block)."

Method 1

In Method 1, when a remote UE is Out-of-Coverage (OOC), the Relay UE transmits information indicating that the Relay UE is OOC. In this case, the Relay UE does not need to broadcast Relay SIB.

When the Remote UE receives SIB 18 while a first timer (e.g., a T1 time) is driven, procedures described later with reference to FIG. 6 may be performed.

FIG. 6 illustrates an example of performing a method for power saving of a Relay UE and/or a Remote UE, the method which is proposed in this specification.

To provide a better precision, FIG. 6 is divided into FIG. 6A and FIG. 6B. That is, FIGS. 6A and 6B correspond to one continuous procedure.

Referring to FIG. 6, the Remote UE checks whether system information (e.g., SIB 18) is received in S601.

The following Tables 1 and 2 show examples of SIB 18.

TABLE 1

```
-- ASN1START
SystemInformationBlockType18-r12 ::= SEQUENCE {
    commConfig-r12                    SEQUENCE {
        commRxPool-r12                    SL-CommRxPoolList-r12,
        commTxPoolNormalCommon-r12        SL-CommTxPoolList-r12
    OPTIONAL, -- Need OR
        commTxPoolExceptional-r12         SL-CommTxPoolList-r12
    OPTIONAL, -- Need OR
        commSyncConfig-r12                SL-SyncConfigList-r12    OPTIONAL -
    }                                                              OPTIONAL, --
Need OR
    lateNonCriticalExtension          OCTET STRING                 OPTIONAL,
    ...,
    [[ commTxPoolNormalCommonExt-r13        SL-CommTxPoolListExt-r13
    OPTIONAL, -- Need OR
        commTxResourceUC-ReqAllowed-r13     ENUMERATED {true}
    OPTIONAL, -- Need OR
        commTxAllowRelayCommon-r13          ENUMERATED {true}
    OPTIONAL -- Need OR
    ]]
}
-- ASN1STOP
```

TABLE 2

| SystemInformationBlockType18 field descriptions |
|---|
| commRxPool |
| Indicates the resources by which the UE is allowed to receive sidelink communication while in RRC_IDLE and while in RRC_CONNECTED. |
| commSyncConfig |
| Indicates the configuration by which the UE is allowed to receive and transmit synchronisation information. E- |

TABLE 2-continued

SystemInformationBlockType18 field descriptions

UTRAN configures commSyncConfig including txParameters when configuring UEs by dedicated signalling to transmit synchronisation information.
commTxAllowRelayCommon Indicates whether the UE is allowed to transmit relay related sidelink communication data using the transmission pools included in SystemInformationBlockType18 i.e. either via commTxPoolNormalCommon, commTxPoolNormalCommonExt or via commTxPoolExceptional.
commTxPoolExceptional Indicates the resources by which the UE is allowed to transmit sidelink communication in exceptional conditions, as specified in 5.10.4.
commTxPoolNormalCommon Indicates the resources by which the UE is allowed to transmit sidelink communication while in RRC_IDLE or when in RRC_CONNECTED while transmitting sidelink via a frequency other than the primary.
commTxPoolNormalCommonExt Indicates transmission resource pool(s) in addition to the pool(s) indicated by field commTxPoolNormalCommon, by which the UE is allowed to transmit sidelink communication while in RRC_IDLE or when in RRC_CONNECTED while transmitting sidelink via a frequency other than the primary. E-UTRAN configures commTxPoolNormalCommonExt only when it configures commTxPoolNormalCommon.
commTxResourceUC-ReqAllowed Indicates whether the UE is allowed to request transmission pools for non-relay related one-to-one sidelink communication.

If the Remote UE fails to receive SIB 18, the Remote UE keeps monitoring SIB 18 for a period of transmission of SIB 18 until receiving the SIB 18 which is periodically broadcasted).

When the Remote UE receives the SIB 18, the Remote UE checks whether the Remote UE is OOC in S602.

If it is found that the Remote UE is OOC, the Remote UE checks a common transmit resource in S603.

In S603, more specifically, the Remote UE checks a common transit resource, which is set through RRC signaling or previously set, and then selects a resource to be transmitted.

The transmit resource may include a PSCCH resource pool and/or a PSSCH resource pool which is transmitted and received among UEs.

In addition, the Remote UE broadcasts, to at least one neighboring (or adjacent) Relay UE (e.g., Relay UE1, Relay UE2), a message including indication information which indicates that the Remote UE is OOC in S604.

Then, the adjacent Relay UE transmits Relay SIB in S605.

The Relay SIB may include access control-related information.

In addition, the adjacent Relay UE determines T0 period (e.g., 1 sec) and notifies the determined T0 period to the Remote UE.

Then, the adjacent Relay UE broadcasts its state information or battery state information in S606.

The battery state information may be included in the state information.

The state information or the battery state information may include at least one of remaining battery information, information about a remaining life of battery, or battery capacity information.

Then, the adjacent Relay UE determine T1 period (e.g., 5 sec) and starts a T1 timer.

The T1 timer may expire at T10.

Settings of the T1 timer may differ among Relay UEs.

Then, the Remote UE checks whether additional information about the adjacent Relay UE is necessary in S607.

If it is found that the additional information is necessary, the Remote UE requests the additional information from the adjacent Relay UE in S608.

The additional information may include information about a rate/speed of change in the battery balance, a discharging/charging speed, etc.

In addition, the additional information may include at least one of: information indicating whether accommodating a Remote UE(s) is possible in consideration of the current charging or discharging speed; or overheard battery state information of another Relay UE(s).

Then, the adjacent Relay UE transmits the requested additional information to the Remote UE in S609.

Then, the Remote UE determines a Relay UE which will first perform connection using the received information in S610.

Then, the Remote UE transmits a result of the determination as to a Relay UE to the determined Relay UE in S611.

Then, the determined Relay UE checks whether the T1 timer has expired in S612.

When it is found that the T1 timer has expired, the determined Relay UE stops transmitting the Relay-SIB and transmitting the battery state information in S613.

If the Remote UE transmits a connection request to any Relay UE (e.g., Relay UE 1) in S614, Relay UE1 determines whether to accept or reject the connection request in S615.

When checking availability of overheard battery state information of another Relay UE and determining that the overheard battery state information is available, Relay UE 1 may consider the overheard battery state information when making a determination as to the connection request.

Method 2

Method 2 relates to a method by which a Relay UE transmits only battery state information using Relay-SIB when there is a pre-request about connection establishment.

FIG. 7 illustrates another example of performing a method for power saving of a Relay UE and/or a Remote UE, the method which is proposed in this specification.

To provide a better precision, FIG. 7 is divided into FIGS. 7A and 7B. That is, FIGS. 7A and 7B correspond to one continuous procedure.

Referring to FIG. 7, at least one neighboring Relay UE (e.g., Relay UE1, Relay UE2) broadcasts Relay-SIB to neighbors in S701.

Then, a Remote UE checks whether the Remote UE is OOC in S702.

When it is found that the Remote UE is OOC, the Remote UE checks a common transmit resource in S703, and transmits, to the at least one neighbor Relay UE, indication information which indicates that the Remote UE is OOC in S704.

Then, the neighboring Relay UE checks whether it has received, from the Remote UE, a message including the indication information which indicates that the Remote UE is OOC in S705.

When it is found that the neighboring Relay UE has received, from the Remote UE, the message including the indication information which indicates that the Remote UE is OOC, the neighboring Relay UE broadcasts its state information or battery state information to the Remote UE in S706.

Following steps S707 to S7013 are the same as steps S607 to S601 in FIG. 6, and thus, detailed description thereof are the same as provided in FIG. 6.

Hereinafter, based on the above description, a method of operation of a Relay UE for a power saving purpose will be described with reference to FIG. 8.

FIG. 8 is a flowchart illustrating an example of an operation method of a Relay UE for power saving of the Relay UE and/or a Remote UE, the method which is proposed in this specification.

First, the Relay UE transmits state information of the Relay UE to at least one Remote UE in S801.

The state information of the Relay UE may include battery state information of the Relay UE.

The state information may be expressed as first control information, and the battery state information may be expressed as second control information.

In addition, the battery state information of the Relay UE may include at least one of a total capacity of a battery y, a remaining life (length) of the battery, or a remaining capacity of the battery.

Then, the Relay UE receives, from one or more Remote UEs, connection requests for transmitting and receiving signals among UEs in S802.

Then, based on its own battery state information, the Relay UE determines whether to accept or reject the connection requests from the one or more Remote UEs in S803.

Then, the Relay UE transmits a response including a result of the determination to the one or more Remote UEs in S804.

The state information of the Relay UE may further include information indicating the number of Remote UEs being connected to the Relay UE.

In addition, the Relay UE may receive state information from an adjacent Relay UE from the adjacent Relay UE.

The state information of the adjacent Relay UE may include at least one of: battery state information of the adjacent Relay UE; or information indicating the number of Remote UEs being connected to the adjacent Relay UE.

Then, using at least one of the state information of the Relay UE or the state information of the adjacent Relay UE, the Relay UE may determine whether to accept or reject the connection requests from the one or more Remote UEs in S805.

In addition, the Relay UE may receive a request of transmission of first additional information from the one or more Remote UEs which transmit the connection requests.

Accordingly, the Relay UE transmits the requested first additional information to the one or more Remote UEs.

The first additional information may include at least one of: information indicating that the battery is being charged enough to establish connection with the one or more Remote UEs; or information indicating that the battery is being discharged.

In addition, the first additional information may further include information indicating that, when there is a request for connection to the Relay UE, the request for connection is acceptable.

If the Relay UE does not accept a request for connection with the one or more Remote UEs, the response may include information indicating the presence of another Relay UE in the same coverage of the one or more Remote UEs.

The first additional information may be included in the state information of the Relay UE or may be transmitted separately.

In addition, the Relay UE may receive a request for transmitting second additional information from the one or more Remote UEs.

Thus, the Relay UE may transmit the second additional information which is requested by the one or more Remote UEs.

The second additional information may include at least one of: information indicating whether a charging speed of the battery is fast enough to accept connection requests from the one or more Remote UEs; or information indicating a discharging speed of the battery.

In addition, the second additional information may be included in the state information of the Relay UE or in the first additional information.

In addition, the Relay UE may transmit may transmit its identification information to the one or more Remote UEs.

The identification information may be transmitted along with the state information of the Relay UE.

The adjacent Relay UE may be a UE existing in the coverage of the Relay UE.

Second Embodiment

The second embodiment is about a method by which a Relay UE is switched into a Remote UE (that is, a Remote UE mode) to transmit and receive a signal.

Operation according to the second embodiment may be one exemplary operation for power saving of the Relay UE.

First, the Remote UE used in this specification may mean a UE which moves out of the coverage of a cellular network (e.g., 3GPP system) or which exists out of the coverage.

Alternatively, the Remote UE may mean a UE as which a Relay UE is serving.

Connection between the Remote UE and the Relay UE may be indirect network connection or sidelink, and may be defined as one mode for network connection.

If the Relay UE moves into 3GPP coverage, the Relay UE may operate as a Remote UE which, for example, searches for an adjacent Relay UE.

In this case, an operation mode of the Relay UE may be defined as a Remote UE mode.

In contrast, a mode in which the Relay UE does not operate as a Remote UE may be defined as a Relay UE mode for the sake of convenience of explanation.

If the relay UE overhears information, such as battery state information of another Relay UE(s) or battery-related additional information, the Relay UE may utilize the overheard information to determine whether to establish connection with a Remote UE which searches for Relay UEs.

Hereinafter, operation by the Relay UE switched to the Remote UE mode will be described in more detail with reference to FIG. 9.

FIG. 9 is a flowchart illustrating an example of an operation method of a Relay UE proposed in this specification.

First, when a particular condition is satisfied, the Relay UE is switched to the Remote UE mode in S901.

As described above, the Remote UE mode indicates a mode in which the Relay UE operates as a Remote UE.

In addition, the particular condition may be at least one of: an emergency situation; a situation where a link between the Relay UE and a base station is failed due to Radio Link Fail (RLF); a situation where the Relay UE is out of a particular coverage; a situation where a Relay UE using a non-licensed band has entered a coverage using a licensed band; or a situation where a battery is not sufficiently charged to the extent that the Relay UE is able to operate as a Relay UE.

Then, in the Remote UE mode, the Relay UE monitors a channel through which a signal from a specific Relay UE is transmitted in S902.

The channel through which a signal from the specific Relay UE is transmitted may be PC 5 Interface or sidelink.

Monitoring of the channel through which a signal from the specific Relay UE is transmitted can be performed only when the Relay UE is switched to the Remote UE mode.

Then, the Relay UE may receive Relay-related system information which indicates state information an adjacent Relay UE is transmitted for each specific period through the monitoring in S903.

The Relay-related System Information Block type 2 may be expressed as R-SIB 2.

Then, in S904, the Relay UE may receive the state information of the adjacent Relay UE from the adjacent Relay UE based on the indication information received in step S904.

The state information of the adjacent Relay UE may include battery state information of the adjacent Relay UE.

The battery state information of the adjacent Relay UE may include a total capacity of a battery, a remaining life (length) of the battery, or a remaining capacity of the battery.

Then, the Relay UE transmits a connection request to transmit and receive the signal with respect to the adjacent Relay UE in S905.

At this point, along with the connection request, the Relay UE may transmit cause information indicating a cause of why the Relay UE is switched to the Remote UE mode.

Then, the Relay UE receives a response to the connection request from the adjacent Relay UE in S906.

The response in step S906 may indicate accept or rejection of the connection request.

FIG. 10 is a block diagram illustrating a wireless device in which methods as proposed herein may be implemented.

In this case, the wireless device may be a BS, UE, WT, AP, MME or a network entity.

As shown in FIG. 10, the network entity 1010 and the UE 1020 include communication units (transmitting/receiving units, RF units (or RF module), 1013 and 1023), processors 1011 and 1021, and memories 1012 and 1022.

The network entity and the UE may further input units and output units.

The communication units 1013 and 1023, the processors 1011 and 1021, the input units, the output units, and the memories 1012 and 1022 are operatively connected with each other in order to conduct the methods as proposed herein.

The communication units (transmitting/receiving units or RF units, 1013 and 1023), when receiving information created from a Physical Layer (PHY) protocol, transfer the received information through Radio Frequency (RF) spectrums and conduct filtering and amplification, then transmit the results through antennas.

Furthermore, the communication units transfer Radio Frequency (RF) signals received through the antennas to bands capable of being processed by the PHY protocol, and perform filtering.

However, the communication units may also include the functions of switches to switch transmitting and receiving functions.

The processors 1011 and 1021 implement functions, procedures, and/or methods as proposed herein. The layers of radio interface protocols may be implemented by the processors.

The processors may be represented as control parts, controllers, control units, or computers.

The memories 1012 and 1022 are connected with the processors to store protocols or parameters for tracking a location vehicle UE.

The processor may include an application-specific integrated circuit (ASIC), a separate chipset, a logic circuit, and/or a data processing unit. The memory may include read-only memory (ROM), random access memory (RAM), flash memory, memory cards, storage media and/or other equivalent storage devices. The RF unit may include a baseband circuit for processing a radio signal. When the embodiment of the present invention is implemented in software, the aforementioned methods may be implemented with a module (or a process or a function) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Furthermore, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the procedure of transceiving a wake-up signal as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Furthermore, the recording media readable by the processor may be distributed to computer systems connected with each other via a network, and processor readable codes may be stored and executed in a distributing manner.

FIG. 11 illustrates a block diagram of a wireless device according to an example of the present specification.

Specifically, FIG. 11 illustrates the terminal (UE) of FIG. 10 in detail.

Referring to FIG. 11, the UE may include a processor (or a digital signal processor (DSP) 1110, a radio frequency (RF) module (or an RF unit) 1135, a power management module 1105, an antenna 1140, a battery 1155, a display 1115, a keypad 1120, a memory 1130, a subscriber identification module (SIM) card 1125 (this element is optional), a speaker 1145, and a microphone 1150. The UE may also include a single antenna or multiple antennas.

The processor 1110 implements the functions, processes and/or methods proposed in FIGS. 1 to 9 described above. A layer of a radio interface protocol may be implemented by the processor 1110.

The memory may be connected to the processor 1110 and stores information related to an operation of the processor 1110. The memory 1130 may be present within or outside the processor 1110 and may be connected to the processor 1110 by a well known unit.

A user may input command information such as a phone number, or the like, by pressing (or touching) a button of the keypad 1120 or by voice activation using the microphone 1150. The processor 1110 receives the command information and performs an appropriate function such as making a call, or the like. Operational data may be extracted from the SIM card 1125 or the memory 1130. Also, the processor 1110 may display command information or driving information on the display 1115 for user recognition or for user convenience.

The RF module 1135 is connected to the processor 1110 and transmits and/or receives an RF signal. The processor 1110 delivers command information to the RF module 1135 in order to initiate communication, for example, in order to transmit a wireless signal forming voice communication data. The RF module 1135 includes a receiver and a transmitter to receive and transmit a wireless signal. The antenna 1140 serves to transmit and receive a wireless signal. When a wireless signal is received, the RF module 1135 delivers the signal and converts the signal to a baseband signal so as to be processed by the processor 1110. The processed signal may be converted into an audible or readable information output through the speaker 1145.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

Examples in which the method for transmitting and receiving a wake-up signal in a wireless communication system according to an embodiment of the present invention has been applied to 3GPP LTE/LTE-A/LTE-Pro/New Rat systems have been described, but the method may be applied to various wireless communication systems in addition to the 3GPP LTE/LTE-A/LTE-Pro/New Rat systems.

What is claimed is:

1. A method for transmitting and receiving by a Relay user equipment (UE), a signal in a wireless communication system, the method comprising:
   receiving indication information which indicates a remote UE is out of coverage from one or more remote UEs;
   transmitting state information of the Relay UE to the one or more remote UEs based on the indication information,
   wherein the state information of the Relay UE includes battery state information of the Relay UE, and
   wherein the battery state information of the Relay UE includes:
      a total capacity of a battery of the Relay UE,
      a remaining life of the battery of the Relay UE,
      a remaining battery capacity of the battery of the Relay UE,
      charge speed information for whether a speed at which the battery of the Relay UE is charged is sufficient to accept a connection request from the one or more remote UEs,
      discharge speed information for whether a speed at which the battery of the Relay UE is discharged is sufficient to accept the connection request from the one or more remote UEs, and
      battery state information of another Relay UE,
   receiving the connection request for transmitting and receiving the signal from the one or more remote UEs;
   determining whether or not to accept the connection request for the one or more remote UEs based on the state information of the Relay UE; and
   transmitting a response including the determination result to the one or more remote UEs,
   wherein a transmission of the state information of the Relay UE is stopped based on a specific timer being started with an initial transmission of the battery state information of the Relay UE.

2. The method of claim 1, wherein the state information of the Relay UE further includes information for the number of the one or more remote UEs connected to the Relay UE.

3. The method of claim 2, further comprising:
receiving state information of a neighbor Relay UE from the neighbor relay UE,
wherein the state information of the neighbor Relay UE includes at least one of battery state information of the neighbor Relay UE and information for the number of the one or more remote UEs connected to the neighbor Relay UE.

4. The method of claim 3, wherein the determination as to whether or not to accept the connection request for the one or more remote UEs uses at least one of the state information of the Relay UE and the state information of the neighbor Relay UE.

5. The method of claim 3, wherein the neighbor relay UE is a UE that is within a coverage of the Relay UE.

6. The method of claim 1, further comprising:
receiving a request for transmitting a first additional information from the one or more remote UEs; and
transmitting the first additional information to the one or more remote UEs.

7. The method of claim 6, wherein the first additional information indicates whether the battery is sufficiently charged to connect to the one or more remote UEs, or whether the battery is being discharged.

8. The method of claim 7, wherein the first additional information further includes information indicating that the connection request is acceptable.

9. The method of claim 6, wherein the first additional information is included in the state information of the Relay UE.

10. The method of claim 1, wherein the response includes information for whether another Relay UE is within the same coverage as the one or more Remote UEs if the connection request is not accepted.

11. The method of claim 1, further comprising:
transmitting identification information identifying the relay UE to the one or more remote UEs,
wherein the identification information is transmitted together with the state information of the Relay UE.

12. A Relay user equipment (UE) for transmitting and receiving a signal in a wireless communication system, the Relay UE comprising:
a communication module configured to communicate with the outside in a wireless or a wired manner; and
a processor functionally connected to the communication module, wherein the processor is configured:
to receive indication information which indicates a remote UE is out of coverage from one or more remote UEs,
to transmit state information of the Relay UE to the one or more remote UEs based on the indication information,
wherein the state information of the Relay UE includes battery state information of the Relay UE, and
wherein the battery state information of the Relay UE includes:
a total capacity of a battery of the Relay UE,
a remaining life of the battery of the Relay UE,
a remaining battery capacity of the battery of the Relay UE,
charge speed information for whether a speed at which the battery of the Relay UE is charged is sufficient to accept a connection request from the one or more remote UEs,
discharge speed information for whether a speed at which the battery of the Relay UE is discharged is sufficient to accept the connection request from the one or more remote UEs, and
battery state information of another Relay UE,
to receive the connection request for transmitting and receiving the signal from the one or more remote UEs;
to determine whether or not to accept the connection request for the one or more remote UEs based on the state information of the Relay UE; and
to transmit a response including the determination result to the one or more remote UEs,
wherein a transmission of the state information of the Relay UE is stopped based on a specific timer being started with an initial transmission of the battery state information of the Relay UE.

* * * * *